UNITED STATES PATENT OFFICE.

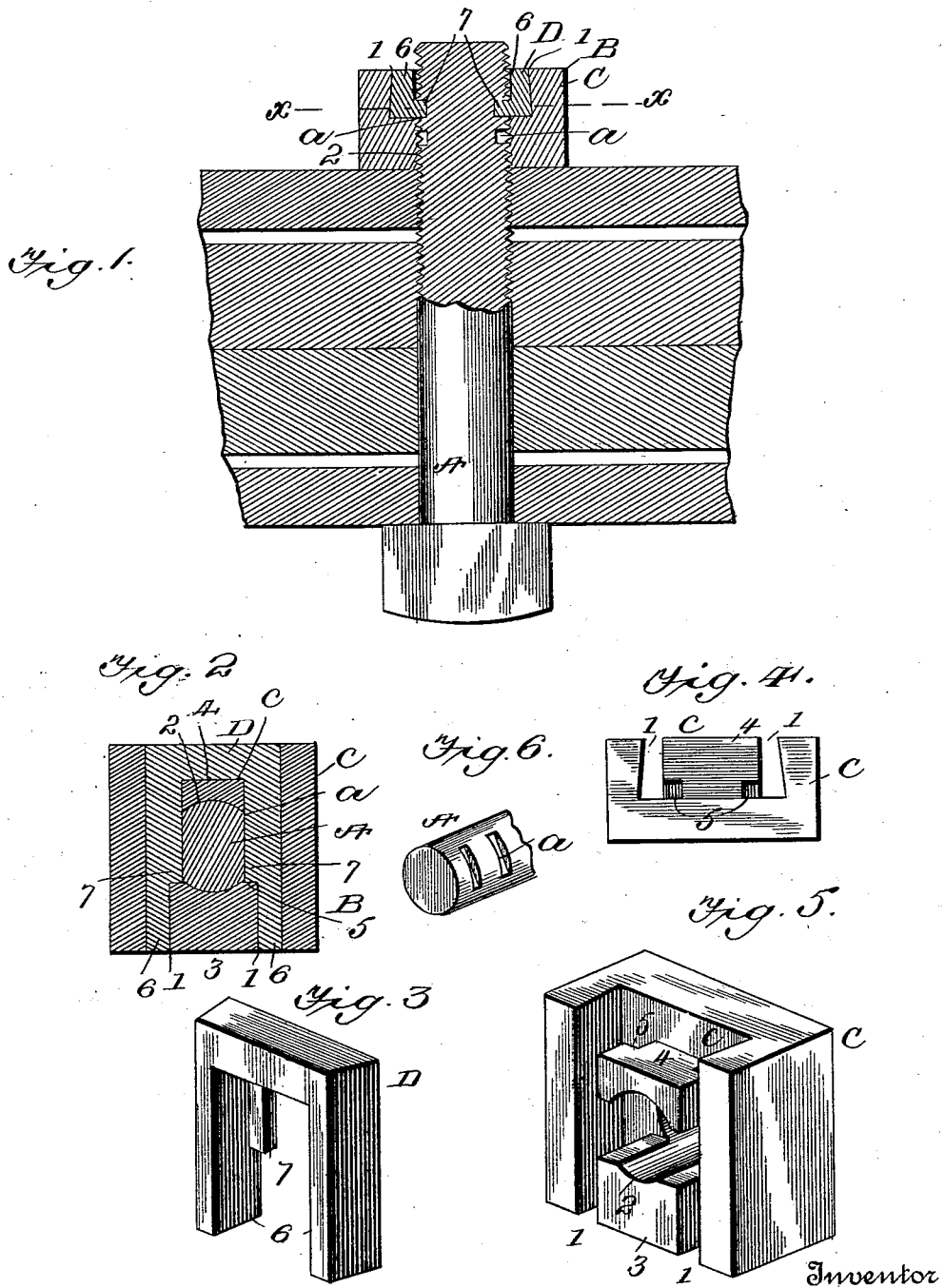

TIMOTHY W. MURPHY, OF WASHINGTON, DISTRICT OF COLUMBIA.

NUT AND BOLT LOCK.

SPECIFICATION forming part of Letters Patent No. 563,201, dated June 30, 1896.

Application filed November 25, 1895. Serial No. 570,096. (No model.)

*To all whom it may concern:*

Be it known that I, TIMOTHY W. MURPHY, a citizen of the United States, residing at Washington, in the District of Columbia, have invented certain new and useful Improvements in Nut and Bolt Locks; and I do hereby declare the following to be a full, clear, and exact description of my invention, such as will enable others skilled in the art to which it appertains to make and use the same, reference being had to the accompanying drawings.

This invention is an improvement in nut and bolt locks, and its objects are to produce the safest and surest locking device consistent with simplicity; to provide a nut and bolt lock in which all the parts will be contained within a nut of the usual size, and to supply such an article at a reasonable cost.

With these objects in view the invention resides in the various novel details of construction and in the combinations of the parts.

The invention is illustrated in the accompanying drawings, in which like letters and figures of reference indicate corresponding parts.

In the drawings, Figure 1 is a view, partly in section and partly in plan, showing my bolt and nut locked in position upon a fish-plate or the like. Fig. 2 is a view of the whole device, taken on the plane $x\ x$ of Fig. 1. Figs. 3, 4, and 5 are views showing in detail the component parts of the locking-nut; and Fig. 6 is a view showing in detail one form of bolt.

In the drawings, the letter A indicates the bolt, which may be screw-threaded, as shown in Fig. 1, or plain, as shown in Fig. 6. This bolt is provided at any suitable place or places along its length with chord-like cuttings or depressions $a$. If the bolts are made expressly to fit a particular piece of work where the bolt length is determined beforehand, a single pair of depressions $a$ will be all that is required, but ordinarily a series of such depressions will be needed to allow for adjustment of the nut to fit the particular piece of work in each case.

The letter B indicates the locking-nut as an entirety, and this nut consists of two interlocking parts C and D, the part C being provided with a circular opening, screw-threaded or not, adapted to receive the bolt, and the part D being adapted to slide into its seat in the part C and by means of spline-like keys to lock the bolt and nut together. The part C is cut away to form two grooves 1 1 on either side of the central opening, which is marked 2. These grooves are tangential to the said central opening and are parallel to each other, and they are wider at their bottoms than they are at the surface of the nut, after the manner of a dovetail. Between the grooves two portions of the body of the nut 3 and 4 are left standing and the portion marked 4 is undercut, as shown at 5 on either side, for the purpose of receiving the spline-like keys of the part D. The part D is in plan a rectangular U, while in cross-section at the base of the U it is a trapesium, or tongue, adapted to fit the dovetail groove formed in the part C. The arms 6 6 of the part D are adapted to fit within, by sliding, the grooves 1 1 of the part C, and these arms have spline-like projections 7 7, extending inwardly from their inner surfaces and adapted to engage the undercuts 5 5 in the other part of the nut and the depressions $a\ a$ in the bolt, thus locking the two together.

As will easily be seen, the bolt may be threaded or not, as may be deemed most convenient, but, of course, with a threaded bolt a threaded nut must also be used. In any case the locking action of the two sections or parts of the nut is of a positive character and holds the bolt as well as the nut from movement. In practice it is found advisable to make a slight divergence from exact parallelism between the grooves 1 1; or the grooves may be slightly contracted near their farther ends, and this is done in order to cramp the arms 6 6 and thus hold the parts C and D firmly together.

The recess $c$ is merely provided as a seat for the cross-bar of the U-shaped piece D, and has no other function than as such seat to permit the parts to be snugly joined together and simulate the appearance of a nut made in a single piece.

I find it advisable to use a washer in connection with the nut in some instances, as the depressions in the bolt are separated from each other at greater distances than the normal variations in the bolt length of average work. The washer, however, has not been shown in the drawings, as it is not essential in every case.

Having thus fully described my invention, what I claim as new, and desire to secure by Letters Patent of the United States, is—

1. In a nut and bolt lock the combination with a bolt having opposite depressions in its surface, of a two-part nut, one of the parts having a dovetail depression in its body and the other part adapted to fit in said depression and having key-pieces adapted to lock the bolt by fitting within the opposite depressions in its surface.

2. In a nut and bolt lock the combination with a bolt having opposite chord-like depressions in its surface, of a nut made in two parts adapted to lock together, one of the parts having dovetail grooves in its body tangential to the bolt-opening, and approximately parallel to each other, the said grooves merging on one side into a depression or seat, and the other part of the said nut being adapted to fit within said seat and groove, and having interior spline-like keys adapted to engage the opposite chord-like depressions in the surface of the bolt.

In testimony whereof I affix my signature in presence of two witnesses.

TIMOTHY W. MURPHY.

Witnesses:
CORCORAN THOM,
CHARLES FREDERIC WILSON.